(12) United States Patent
Yasui

(10) Patent No.: US 10,746,977 B2
(45) Date of Patent: Aug. 18, 2020

(54) OPTICAL SYSTEM AND IMAGE PICKUP APPARATUS INCLUDING THE SAME

(71) Applicant: CANON KABUSHIKI KAISHA, Tokyo (JP)

(72) Inventor: Hiroto Yasui, Saitama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 43 days.

(21) Appl. No.: 16/014,070

(22) Filed: Jun. 21, 2018

(65) Prior Publication Data

US 2018/0373004 A1 Dec. 27, 2018

(30) Foreign Application Priority Data

Jun. 22, 2017 (JP) .................................. 2017-122038

(51) Int. Cl.
| | |
|---|---|
| *G02B 15/15* | (2006.01) |
| *G02B 15/167* | (2006.01) |
| *G02B 13/00* | (2006.01) |
| *G02B 13/02* | (2006.01) |
| *G02B 27/42* | (2006.01) |

(52) U.S. Cl.
CPC ......... *G02B 15/167* (2013.01); *G02B 13/002* (2013.01); *G02B 13/02* (2013.01); *G02B 27/4211* (2013.01)

(58) Field of Classification Search
CPC .................................................... G02B 15/167
USPC .......................................................... 359/689
See application file for complete search history.

(56) References Cited

U.S. PATENT DOCUMENTS

| | | | |
|---|---|---|---|
| 2003/0175021 A1 | 9/2003 | Hamano | |
| 2011/0310486 A1* | 12/2011 | Eguchi | ................... G02B 13/18 359/570 |
| 2012/0092779 A1* | 4/2012 | Maetaki | ................. G02B 13/02 359/716 |
| 2012/0229921 A1 | 9/2012 | Eguchi | |

* cited by examiner

*Primary Examiner* — James C. Jones
(74) *Attorney, Agent, or Firm* — Carter, DeLuca & Farrell LLP

(57) ABSTRACT

Provided is an optical system including, in order from an object side to an image side, a front lens unit, an aperture stop, and a rear lens unit. The front lens unit consists of a positive lens and a diffractive optical element, which are arranged in order from the object side to the image side. The diffractive optical element consists of a plurality of lenses that are cemented to each other, and at least one of cemented surfaces of the plurality of lenses is a diffractive surface. An interval on an optical axis between the positive lens and the diffractive optical element is the largest among intervals on the optical axis between two lenses that are adjacent in the optical system.

11 Claims, 13 Drawing Sheets

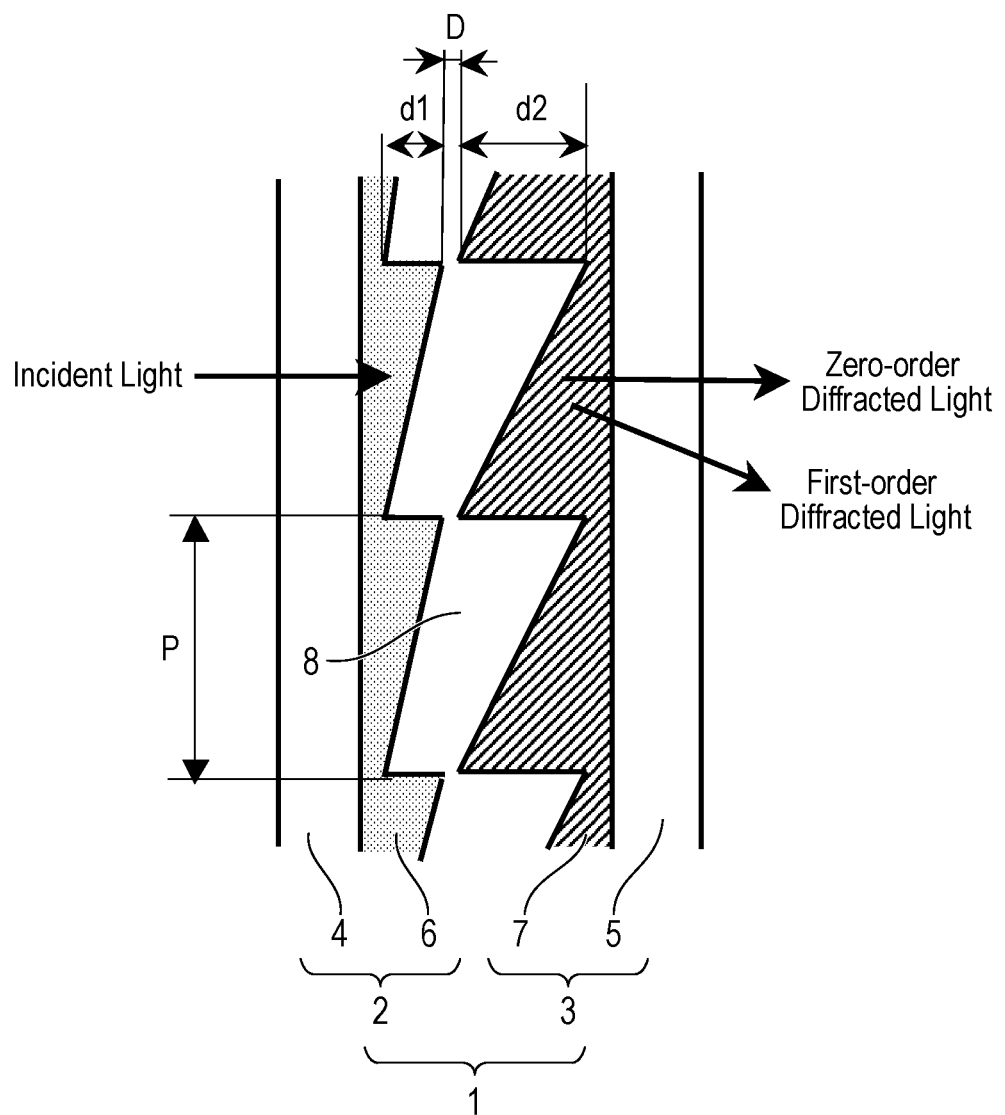

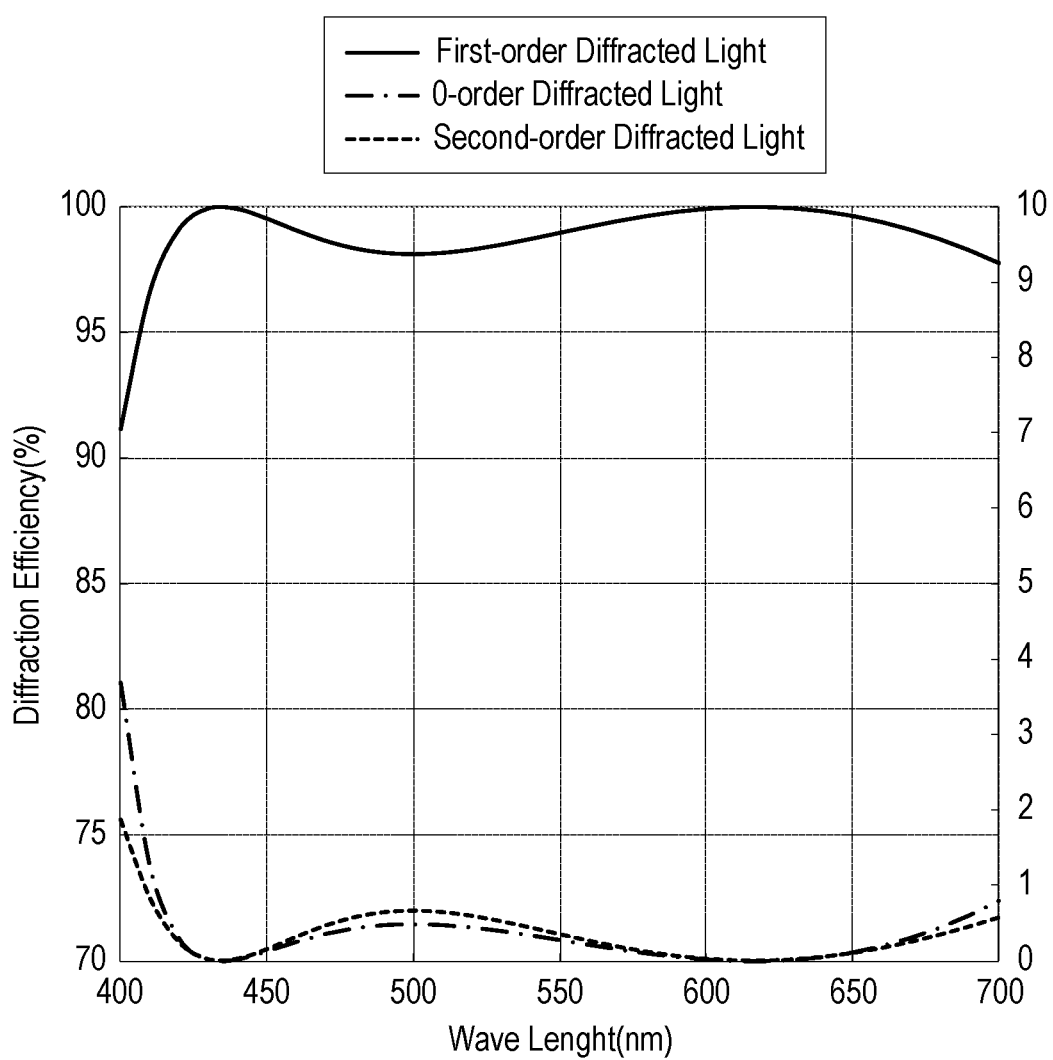

OPTICAL SYSTEM AND IMAGE PICKUP APPARATUS INCLUDING THE SAME

BACKGROUND OF THE INVENTION

Field of the Invention

The present invention relates to an optical system and an image pickup apparatus including the optical system. The optical system is suitable for an image pickup apparatus, for example, a video camera, a digital still camera, a television (TV) camera, a monitoring camera, and a film camera using a silver halide film.

Description of the Related Art

Hitherto, there has been known an optical system obtained specifically for weight reduction of the entire optical system by combining a chromatic aberration correcting effect by a diffractive optical element with correction effects for various aberrations, for example, a spherical aberration, by an aspherical lens.

In each of U.S. Patent Application Publication No. 2012/0092779 and U.S. Patent Application Publication No. 2012/0229921, there is disclosed a telephoto lens including, in order from an object side to an image side: a first lens unit having a positive refractive power; a second lens unit having a negative refractive power, which is configured to move for focusing; an aperture stop; and a third lens unit. In each of U.S. Patent Application Publication No. 2012/0092779 and U.S. Patent Application Publication No. 2012/0229921, the first lens unit includes a positive lens having an aspherical surface and a diffractive optical element having a diffractive surface.

SUMMARY OF THE INVENTION

It is an object of the present invention to provide an optical system in which a configuration of lenses, which are closer to an object than an aperture stop is, is appropriately set so as to reduce an effective lens diameter and a lens weight.

According to one embodiment of the present invention, there is provided an optical system including, in order from an object side to an image side: a front lens unit; an aperture stop; and a rear lens unit, wherein the front lens unit consists of a positive lens and a diffractive optical element, which are arranged in order from the object side to the image side, wherein the diffractive optical element consists of a plurality of lenses that are cemented to each other, and at least one of cemented surfaces of the plurality of lenses is a diffractive surface, and wherein an interval on an optical axis between the positive lens and the diffractive optical element is largest among intervals on the optical axis between two lenses that are adjacent in the optical system.

Further features of the present invention will become apparent from the following description of exemplary embodiments with reference to the attached drawings.

BRIEF DESCRIPTION OF THE DRAWINGS

FIG. 7A, FIG. 7B, and FIG. 7C are explanatory views of a diffractive optical element in one embodiment of the present invention.

FIG. 8A, FIG. 8B, and FIG. 8C are graphs for showing wavelength dependence characteristics of diffraction efficiency of the diffractive optical element in one embodiment of the present invention.

DESCRIPTION OF THE EMBODIMENTS

Preferred embodiments of the present invention will now be described in detail in accordance with the accompanying drawings.

In one embodiment of the present invention, a diffractive optical element is used and a lens configuration is set appropriately to obtain an optical system in which chromatic aberrations are satisfactorily corrected over the entire visible wavelength range while the lens weight is reduced.

In a general optical system to be used in an image pickup apparatus, as the size of the entire optical system is reduced by reducing a total optical length of lenses (distance from a first lens surface to an image plane) while its focal length is increased, chromatic aberrations such as an axial chromatic aberration and a chromatic aberration of magnification among various aberrations are particularly increased. In particular, a telephoto lens, which has a longer focal length, has a higher tendency of this increase.

As a method of reducing the occurrence of such chromatic aberrations, a method of using a diffractive optical element in an optical path is well known. In this method, a negative dispersion characteristic (vd=−3.453) and strong anomalous relative partial dispersion (θgF=0.296) of the diffractive optical element, which are different from those of a normal optical material, are used to facilitate strong achromatization that is not possible with the normal optical material.

Such a diffractive optical element is used in one embodiment of the present invention.

An optical system according to one embodiment of the present invention includes, in order from an object side to an image side, a front lens unit, an aperture stop, and a rear lens unit. The front lens unit consists of a positive lens and a diffractive optical element, which are arranged in order from the object side to the image side. The diffractive optical element consists of a plurality of lenses that are cemented to each other. At least one of cemented surfaces of the plurality of lenses is a diffractive surface, and an interval on an optical axis between the positive lens and the diffractive optical element is the largest among intervals on the optical axis between two lenses that are adjacent in the optical system.

Now, an exemplary embodiment of the present invention is described in detail with reference to the accompanying drawings. The optical system according to one embodiment of the present invention includes a front lens unit, an aperture stop, and a rear lens unit, which are arranged in order from an object side to an image side. The front lens unit consists of a positive lens and a diffractive optical element.

Figure 1:
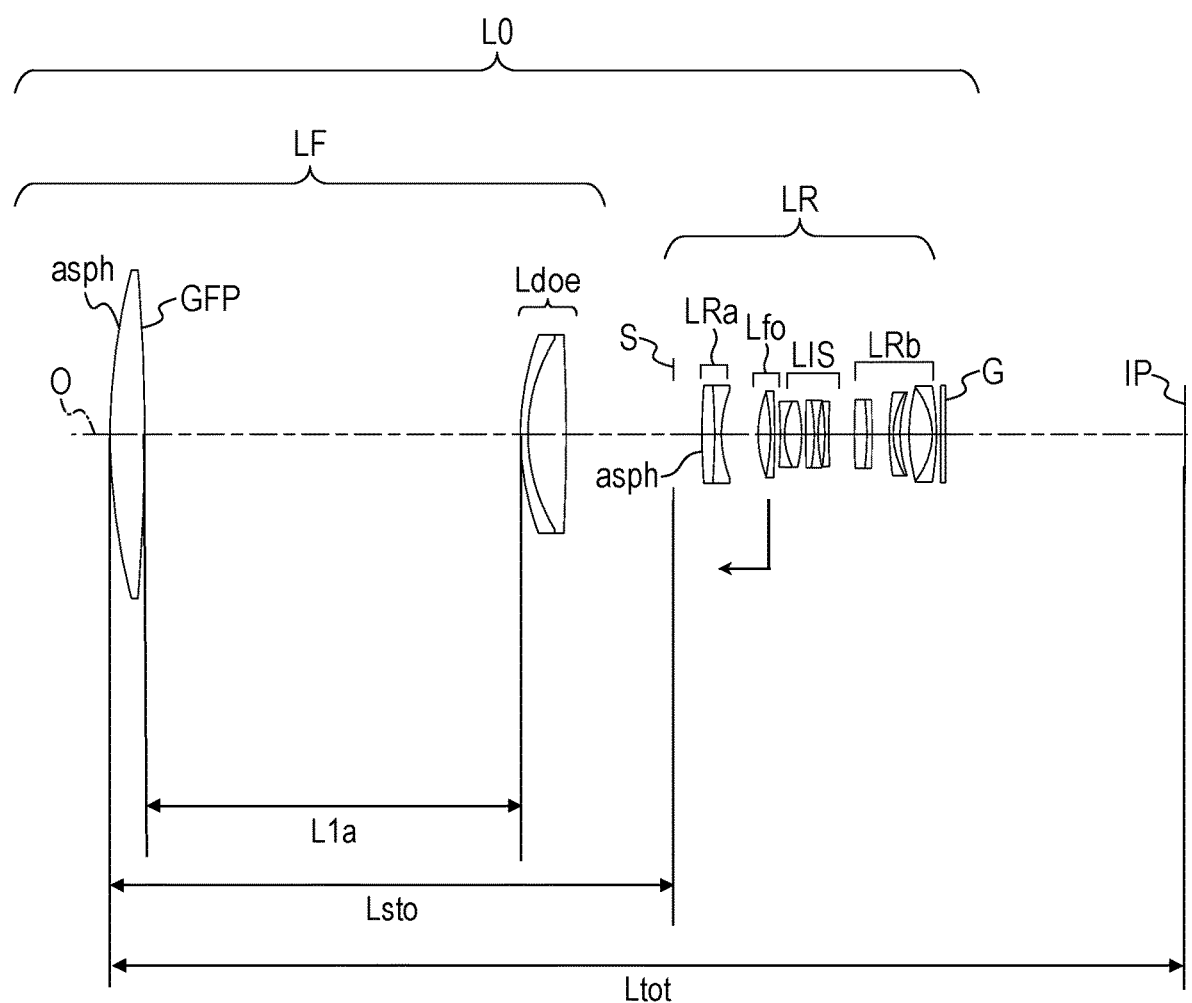
FIG. 1 is a lens cross-sectional view in Embodiment 1 of the present invention when an object distance is at infinity.
Figure 2:
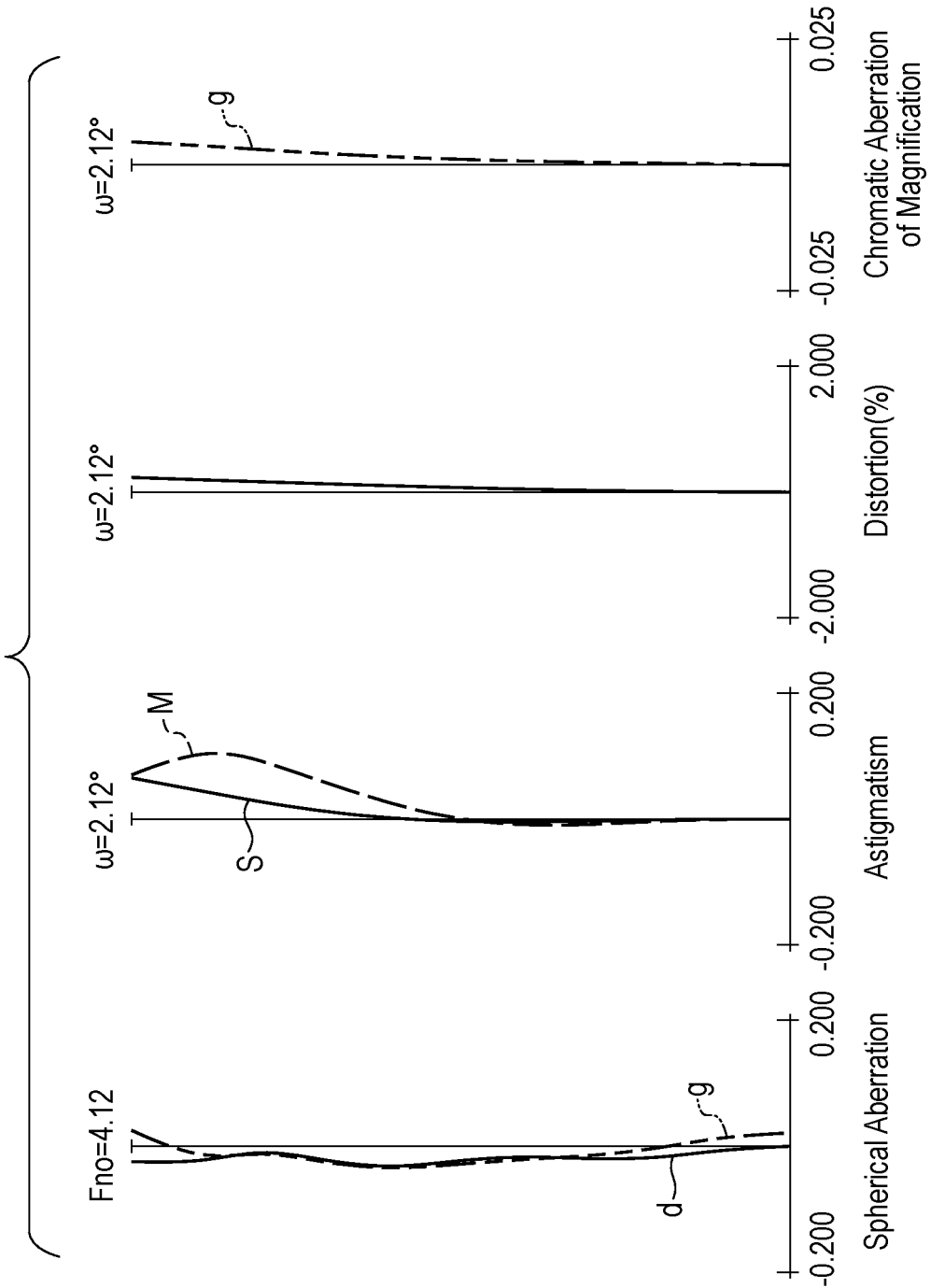
FIG. 2 is aberration diagrams in Embodiment 1 of the present invention when the object distance is at infinity.
Figure 3:
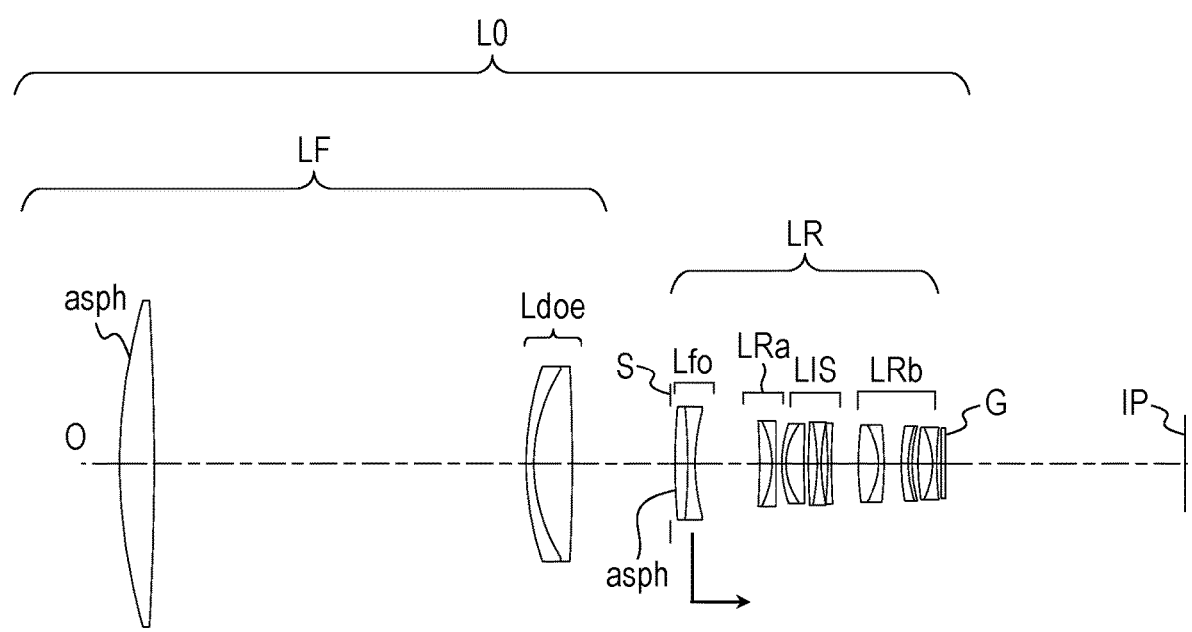
FIG. 3 is a lens cross-sectional view in Embodiment 2 of the present invention when an object distance is at infinity.
Figure 4:
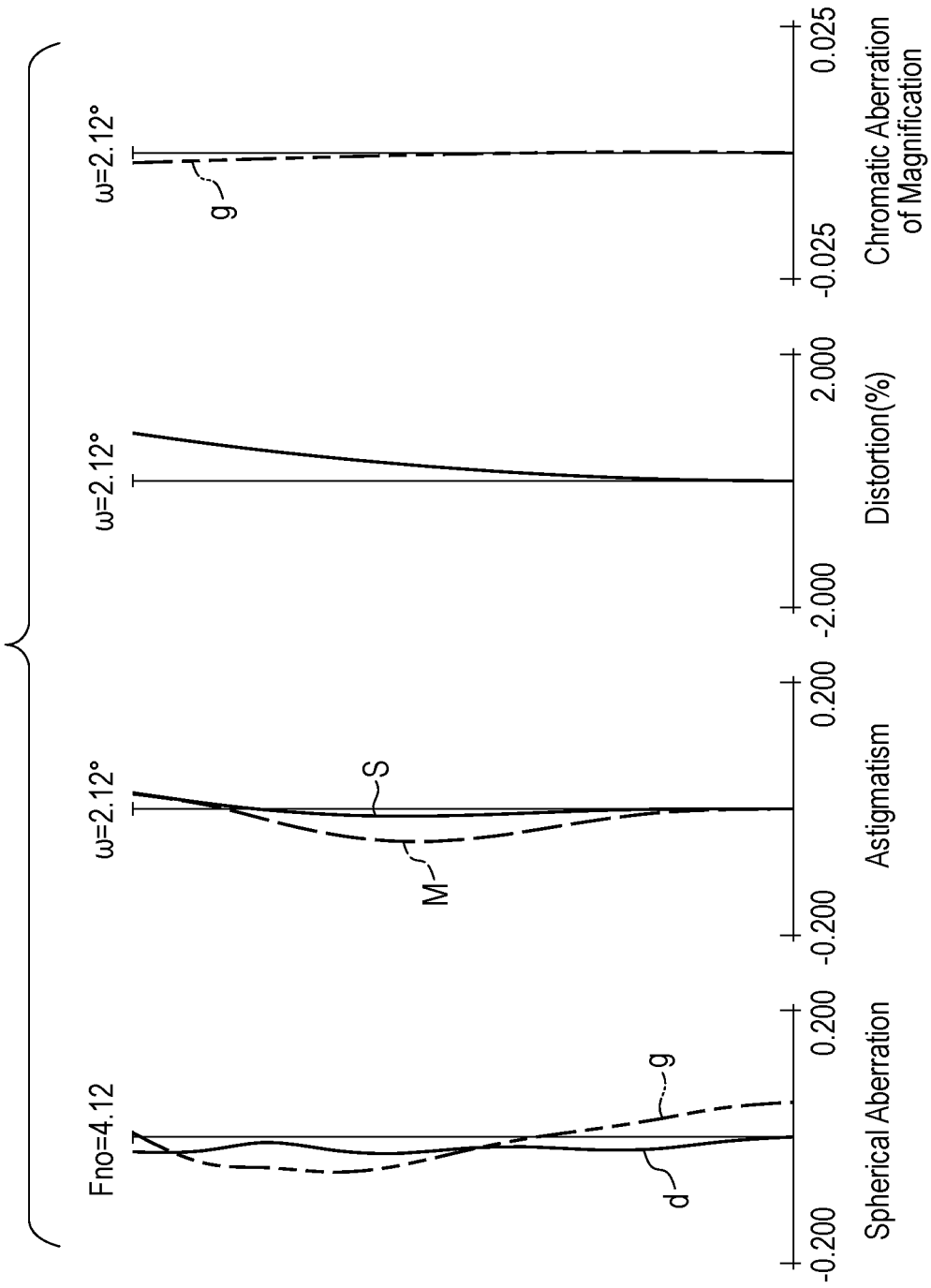
FIG. 4 is aberration diagrams in Embodiment 2 of the present invention when the object distance is at infinity.
Figure 5:
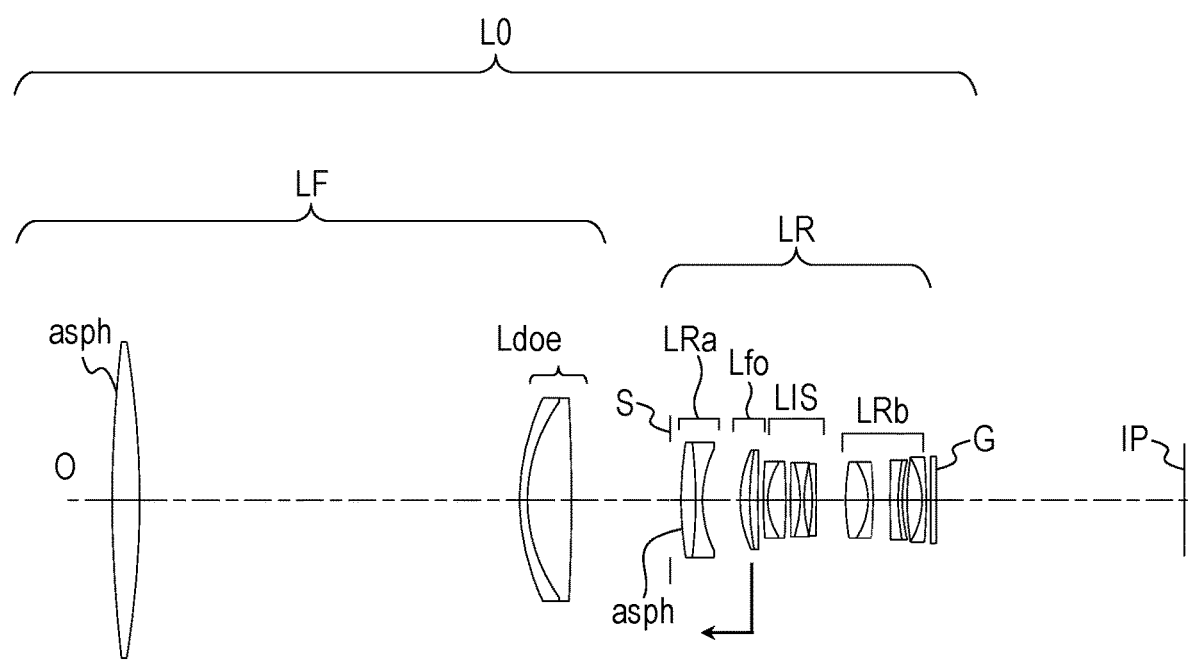
FIG. 5 is a lens cross-sectional view in Embodiment 3 of the present invention when an object distance is at infinity.
Figure 6:
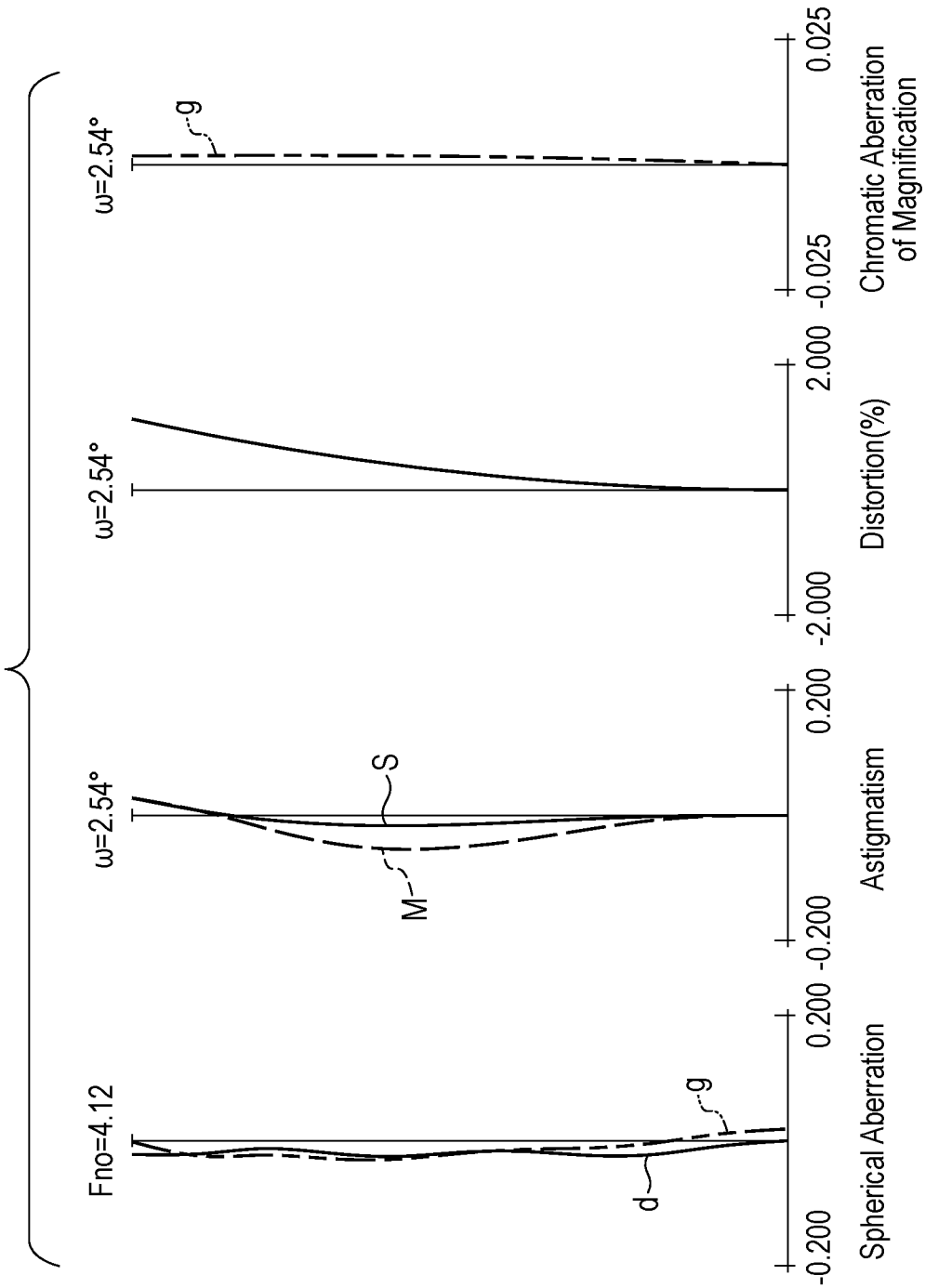
FIG. 6 is aberration diagrams in Embodiment 3 of the present invention when the object distance is at infinity.

FIG. 1 and FIG. 2 are a lens cross-sectional view and aberration diagrams of an optical system according to Embodiment 1 of the present invention, respectively. FIG. 3 and FIG. 4 are a lens cross-sectional view and aberration diagrams of an optical system according to Embodiment 2 of the present invention, respectively. FIG. 5 and FIG. 6 are a lens cross-sectional view and aberration diagrams of an optical system according to Embodiment 3 of the present invention, respectively.

In the lens cross-sectional views, an optical system L0 includes a front lens unit LF, an aperture stop S, and a rear lens unit LR. The front lens unit LF consists of a positive lens GFP and a diffractive optical element Ldoe. The rear lens unit LR includes a focus lens unit Lfo and a lens unit (image stabilization lens unit) LIS for image stabilization. A lens surface "asph" has an aspherical shape. An optical axis O and an image plane IP are illustrated. The image plane IP corresponds to an image pickup surface of an image pickup element. A glass block G is, for example, a crystal low-pass filter or an infrared cut filter. A diffractive surface in the diffractive optical element Ldoe is formed at a cemented surface of a cemented lens obtained by cementing a negative lens and a positive lens.

FIG. 2, FIG. 4, and FIG. 6 are aberration diagrams of Embodiment 1, Embodiment 2, and Embodiment 3 obtained when an object distance is at infinity, respectively. In the spherical aberration diagrams of FIG. 2, FIG. 4, and FIG. 6, a solid line "d" represents a d-line (wavelength: 587.6 nm), and a long dashed double-short dashed line "g" represents a g-line (wavelength: 435.8 nm). In the astigmatism diagrams, a solid line S represents a sagittal ray of the d-line, and a dotted line M represents a meridional ray of the d-line. Further, in the diagrams of the chromatic aberration of magnification, a long dashed double-short dashed line "g" represents the g-line. In the aberration diagrams, Fno represents an F-number, and "ω" represents an image-pickup half angle of view (degrees).

Features of the optical system L0 according to one embodiment of the present invention are described. First, in the optical system L0 according to one embodiment of the present invention, the diffractive optical element is used to optimize the arrangement and configuration of lenses from the viewpoint of reduction in total weight including a weight of a mechanism so that the weight of the entire optical system is reduced. Moreover, chromatic aberrations and various aberrations are corrected satisfactorily. The optical system L0 according to one embodiment of the present invention is a telephoto lens, and specifically, the maximum image-pickup half angle of view thereof is 4.5 degrees or less (a focal length thereof is 300 mm or more when converted to a 35-mm image pickup element).

Many related-art telephoto lenses each include, in order from the object side to the image side: a first lens unit; a second lens unit, which is configured to move in an optical axis direction to perform focusing; an aperture stop; and a third lens unit. At this time, lenses in the first lens unit account for most of the lens weight. Therefore, in the optical system L0 according to one embodiment of the present invention, the lens configuration and the lens arrangement in the first lens unit are optimized so that the lens weight is significantly reduced.

Further, in many cases, the second lens unit is arranged closer to an object than the aperture stop is. There has been a tendency that, when the second lens unit is extended for focusing, the lens diameter of the second lens unit increases and the lens weight increases. Moreover, the second lens unit is a movable lens unit, and hence there has been a tendency that the mechanism becomes complicated and its size is increased, with the result that the mechanical weight is also increased.

Therefore, in the optical system L0 according to one embodiment of the present invention, the front lens unit LF, which is closer to the object than the aperture stop S is, consists of the positive lens GFP and the cemented lens forming the diffractive optical element Ldoe. With this configuration, an interval on the optical axis between the two lenses is made sufficiently large so that the effective lens diameter and the lens weight are reduced. Moreover, the focus lens unit Lfo, which is a movable lens unit for focusing, is arranged closer to an image than the aperture stop S is so that the effective lens diameter and the lens weight are reduced. In this manner, the weight of the entire optical system is reduced.

With regard to a specific lens configuration, the optical system L0 of each Embodiment includes the front lens unit LF, the aperture stop S, and the rear lens unit LR, which are arranged in order from the object side to the image side. The maximum image-pickup half angle of view of the optical system L0 is 4.5 degrees or less. The front lens unit LF includes the positive lens GFP and the diffractive optical element Ldoe, which are arranged in order from the object side to the image side, and the diffractive optical element Ldoe consists of a cemented lens. The diffractive surface is formed at the cemented surface of the cemented lens. An interval on the optical axis between the positive lens GFP and the diffractive optical element Ldoe is the largest among intervals on the optical axis between adjacent lenses that are other lenses included in the optical system L0.

At the time of image stabilization, a partial lens unit, which is a lens unit included in the rear lens unit LR, moves in a direction having a component in a direction orthogonal to the optical axis. Further, at least one optical surface of the lenses included in the front lens unit LF has an aspherical shape.

In Embodiment 1, the rear lens unit LR includes, in order from the object side to the image side, a partial lens unit LRa, which is configured not to move for focusing, and a focus lens unit Lfo, which is configured to move in the optical axis direction for focusing. The rear lens unit LR further includes an image stabilization lens unit LIS, which is configured to move in a direction having a component in a direction vertical to the optical axis at the time of image stabilization, and a partial lens unit LRb, which is configured not to move for focusing.

In Embodiment 2, the rear lens unit LR includes, in order from the object side to the image side, a focus lens unit Lfo, which is configured to move in the optical axis direction for focusing, and a partial lens unit LRa, which is configured not to move for focusing. The rear lens unit LR further includes an image stabilization lens unit LIS, which is configured to move in a direction having a component in the direction vertical to the optical axis at the time of image stabilization, and a partial lens unit LRb, which is configured not to move for focusing. In Embodiment 3, the configuration of the rear lens unit LR is the same as that in Embodiment 1.

Next, an exemplary configuration of the optical system L0 according to one embodiment of the present invention is described. An interval on the optical axis between the positive lens GFP and the diffractive optical element Ldoe is represented by L1$a$. A distance on the optical axis from a lens surface of the positive lens GFP that is the closest to the object to the aperture stop S is represented by Lsto. A total lens length at the time when the infinity is in focus is represented by Ltot. A focal length of the entire optical system at the time when the infinity is in focus is represented by "f". A focal length of the diffractive optical element Ldoe on the diffractive surface is represented by "fdo", and a distance on the optical axis from the diffractive surface to the image plane is represented by Ldoimg.

The rear lens unit LR includes the focus lens unit Lfo, which is configured to move in the optical axis direction for focusing, and a focal length of the focus lens unit Lfo is represented by "ffo". At this time, it is preferred to satisfy at least one of the following conditional expressions.

$$0.5<(L1a/L\text{sto})/(L\text{tot}/f)<1.0 \quad (1)$$

$$0.01<(f/fdo)/(L\text{doimg}/L\text{tot})<0.10 \quad (2)$$

$$0.05<|ffo/f|<0.50 \quad (3)$$

Next, the technical meaning of each of the conditional expressions given above is described. Conditional Expression (1) defines the interval on the optical axis between the positive lens GFP and the diffractive optical element Ldoe included in the front lens unit LF in the optical system L0 according to one embodiment of the present invention. Through definition of Conditional Expression (1), the diameter of the diffractive optical element Ldoe is decreased to reduce the weight of its optical material. When the obtained value exceeds the upper limit value of Conditional Expression (1), and the interval on the optical axis between the positive lens GFP and the diffractive optical element Ldoe becomes excessively larger, it becomes difficult to correct chromatic aberrations.

Meanwhile, when the obtained value falls below the lower limit value of Conditional Expression (1), and the interval on the optical axis between the positive lens GFP and the diffractive optical element Ldoe becomes excessively smaller, the diffractive optical element is arranged closer to the object. This leads to an increase in effective diameter of the diffractive optical element Ldoe and an increase in weight of the front lens unit LF, which is not preferred. Further, in order to reduce the weight of the front lens unit LF and satisfactorily correct various aberrations including the chromatic aberrations in the entire optical system, it is further preferred to set the numerical range of Conditional Expression (1) as follows.

$$0.60<(L1a/L\text{sto})/(L\text{tot}/f)<0.95 \quad (1a)$$

It is still further preferred to set the numerical range of Conditional Expression (1a) as follows.

$$0.70<(L1a/L\text{sto})/(L\text{tot}/f)<0.90 \quad (1b)$$

Conditional Expression (2) is used to correct the chromatic aberrations in the entire optical system and reduce flare caused by the diffractive surface of the diffractive optical element.

The focal length "fdo" on the diffractive surface of the diffractive optical element Ldoe satisfies the following expression, where a designed diffraction order is represented by "m" ("m" is an integer), a designed wavelength is represented by $\lambda 0$, a height in the direction vertical to the optical axis is represented by "r", and a phase coefficient is represented by Ci ("i" is an integer of 1 or more). The phase coefficient "$\psi(r)$" representing the phase shape on the diffractive surface is expressed as follows.

$$\psi(r)=(2\times m\times\pi/\lambda 0)\times(C1\times r^2+C2\times r^4+C3\times r^6+C4\times r^8+C5\times r^{10}+\ldots)$$

When "$\lambda$" is a freely-selected wavelength, the focal length "fdo" on the diffractive surface is a value satisfying the following expression.

$$fdo=-1/(2\times m\times C1\times\lambda/\lambda 0)$$

Conditional Expression (2) defines a relationship between the refractive power on the diffractive surface of the diffractive optical element Ldoe included in the front lens unit LF and an arrangement position of the diffractive surface in the optical path. Through satisfaction of the numerical range of Conditional Expression (2), the flare on the diffractive surface of the diffractive optical element is reduced while the chromatic aberrations are satisfactorily corrected in the entire optical system. When the obtained value exceeds the upper limit value of Conditional Expression (2), the refractive power on the diffractive surface of the diffractive optical element Ldoe becomes excessively stronger with respect to the arrangement position of the diffractive surface in the optical path, and a grating pitch on the diffractive surface becomes excessively smaller. As a result of this, much flare caused by the diffractive surface occurs, and a ratio of the flare that reaches the image plane tends to increase, which is not preferred.

Meanwhile, when the obtained value falls below the lower limit value of Conditional Expression (2), the refractive power on the diffractive surface of the diffractive optical element Ldoe becomes excessively weaker with respect to the arrangement position of the diffractive surface in the optical path, and it becomes difficult to satisfactorily correct the chromatic aberrations generated in the entire optical system. It is further preferred to set the numerical range of Conditional Expression (2) as follows. This facilitates reduction of the flare generated due to the diffractive surface of the diffractive optical element while the chromatic aberrations are satisfactorily corrected in the entire optical system.

$$0.020<(f/fdo)/(L\text{doimg}/L\text{tot})<0.095 \quad (2a)$$

It is still further preferred to set the numerical range of Conditional Expression (2a) as follows.

$$0.030<(f/fdo)/(L\text{doimg}/L\text{tot})<0.090 \quad (2b)$$

Conditional Expression (3) is used to achieve reduction in weight of the entire optical system. In the optical system L0 according to one embodiment of the present invention, a lens unit (focus lens unit Lfo) included in the rear lens unit LR is moved in the optical axis direction to perform focusing. Conditional Expression (3) defines an absolute value of a refractive power of the focus lens unit having a focus function in the rear lens unit LR. With the absolute value falling within the numerical range of Conditional Expression (3), the focus lens unit having the focus function is arranged closer to the image than the aperture stop S is so that reduction in effective lens diameter is facilitated, while various aberrations in the entire optical system are corrected satisfactorily.

When the absolute value exceeds the upper limit value of Conditional Expression (3), and the refractive power of the focus lens unit becomes excessively weaker, the effective lens diameter of the focus lens unit tends to increase. Along therewith, the weight of the focus lens unit tends to increase, and further the weight including the weight of the mechanism tends to increase, which is not preferred. Meanwhile, when the obtained value falls below the lower limit value of Conditional Expression (3), and the refractive power of the focus lens unit becomes excessively stronger, a spherical aberration and an astigmatism tend to increase at a close distance, which is not preferred.

It is further preferred to set the numerical range of Conditional Expression (3) as follows. This facilitates reduction in diameter of the focus lens unit to reduce the weight thereof, and facilitates further reduction in weight of the entire optical system.

$$0.075 < |ffo/f| < 0.400 \quad (3a)$$

It is still further preferred to set the numerical range of Conditional Expression (3a) as follows.

$$0.10 |ffo/f| < 0.30 \quad (3b)$$

In the optical system according to one embodiment of the present invention, it is preferred that the optical surface of at least one of the lenses included in the front lens unit LF have an aspherical shape. This facilitates correction of various aberrations such as a spherical aberration and an astigmatism, while reducing the weight of the front lens unit LF by reduction in number of lenses included in the front lens unit LF.

As described above, according to the present invention, in the optical system using the diffractive optical element, the arrangement and configuration of the lens units are optimized from the viewpoint of the total weight including the weight of the mechanism. Through effective use of the aspherical lens, it is possible to obtain an optical system with a reduced weight in which chromatic aberrations and various aberrations are corrected satisfactorily.

Next, the lens configuration of the optical system according to each Embodiment is described.

Embodiment 1

The optical system L0 according to Embodiment 1 is a telephoto lens (focal length: 585 mm, and Fno (F-number): 4.12). The diffractive optical element Ldoe consists of a cemented lens, which is the second lens counted from the object side. The diffractive surface is formed at the cemented surface of the cemented lens. From Numerical Data 1 described later, the interval on the optical axis between the positive lens GFP and the diffractive optical element Ldoe is the largest among intervals on the optical axis between adjacent lenses that are the other lenses. The use of such a lens configuration facilitates reduction of the lens weight while correcting chromatic aberrations.

Further, the aspherical surface "asph" is formed on each of the object-side optical surface of the positive lens GFP, which is the lens closest to the object, and the object-side optical surface of an image-side cemented lens that is adjacent to the aperture stop S. The formation of those two aspherical lenses reduces the number of lenses included in the front lens unit LF, and facilitates correction of various aberrations such as a spherical aberration and an astigmatism, which increase due to the reduction in number of lenses included in the front lens unit LF.

Focusing from the infinity to the close distance is performed by moving toward the object side the focus lens unit Lfo, which is arranged closer to the image than the aperture stop S is. This facilitates reduction in total weight of the lens weight and the mechanism weight while reducing the diameter of the focus lens unit Lfo.

Embodiment 2

The optical system L0 according to Embodiment 2 is a telephoto lens (focal length: 585 mm, and Fno: 4.12) similar to the optical system L0 according to Embodiment 1. The arrangement position of the diffractive optical element Ldoe on the optical axis, the arrangement position of the aspherical surfaces on the optical axis, and the like are the same as those in Embodiment 1. With such a lens configuration and arrangement, reduction in lens weight is facilitated while chromatic aberrations are corrected, and further, various aberrations such as a spherical aberration and an astigmatism are corrected satisfactorily.

The difference from Embodiment 1 is that the focusing from the infinity to the close distance is performed by moving toward the image side the focus lens unit Lfo, which is arranged closer to the image than the aperture stop S is and adjacent thereto. Similarly to Embodiment 1, this facilitates reduction in total weight of the lens weight and the mechanism weight while reducing the diameter of the focus lens unit Lfo.

Embodiment 3

The optical system L0 according to Embodiment 3 is a telephoto lens (focal length: 487.5 mm, and Fno: 4.12). The arrangement position of the diffractive optical element Ldoe on the optical axis, the arrangement position of the aspherical surfaces on the optical axis, and the like are the same as those in Embodiments 1 and 2. With such a lens configuration and arrangement, reduction in lens weight is facilitated while chromatic aberrations are corrected, and further, various aberrations such as a spherical aberration and an astigmatism are corrected satisfactorily.

Further, similarly to Embodiment 1, the focusing from the infinity to the close distance is performed by moving toward the object side the focus lens unit Lfo, which is arranged closer to the image than the aperture stop S is. At this time, similarly to Embodiment 1, the reduction in total weight of the lens weight and the mechanism weight is facilitated while the diameter of the focus lens unit Lfo is reduced.

As a method of producing the diffractive optical element in each of Embodiments, a method of directly forming a binary optics shape on a lens surface by using a photoresist can be applied. As another embodiment, a method of performing replica formation or molding formation using a mold produced in the method using the photoresist can be applied. When a kinoform having a sawtooth shape is provided, diffraction efficiency is improved, and hence diffraction efficiency close to an ideal value may be expected.

Next, a structure of the diffractive optical element used in the optical system according to one embodiment of the present invention is described. Applicable examples of the structure of the diffractive optical element include a two-layered structure illustrated in FIG. 7A in which an air layer is sandwiched, a three-layered structure illustrated in FIG. 7B in which the air layer is sandwiched, and a cemented two-layer structure illustrated in FIG. 7C in which two layers having the same grating thickness are brought into intimate contact with each other.

In FIG. 7A, a first diffraction grating 6 made of an ultraviolet curing resin is formed on a base 4, to thereby serve as a first diffraction optical portion 2. A second diffraction grating 7 made of an ultraviolet curing resin different from the ultraviolet curing resin of the first diffraction grating 6 is formed on another base 5, to thereby serve as a second diffraction optical portion 3. The first diffraction optical portion 2 and the second diffraction optical portion 3 are provided close to each other through an air layer 8 at an interval D. The two diffraction gratings 6 and 7 act as a single diffractive optical element 1.

In this case, a grating thickness of the first diffraction grating 6 is represented by d1 and a grating thickness of the second diffraction grating 7 is represented by d2. With respect to the grating direction, the grating thickness of the first diffraction grating 6 monotonously decreases in the direction from top to bottom. In contrast to this, the grating thickness of the second diffraction grating 7 monotonously increases in the direction from top to bottom. When incident light enters the diffractive optical element from the left side as illustrated in FIG. 7A, light traveling in a right oblique downward direction is first-order diffracted light, and light traveling in a straight direction is 0 (zero)-order diffracted light.

Figure 7B:
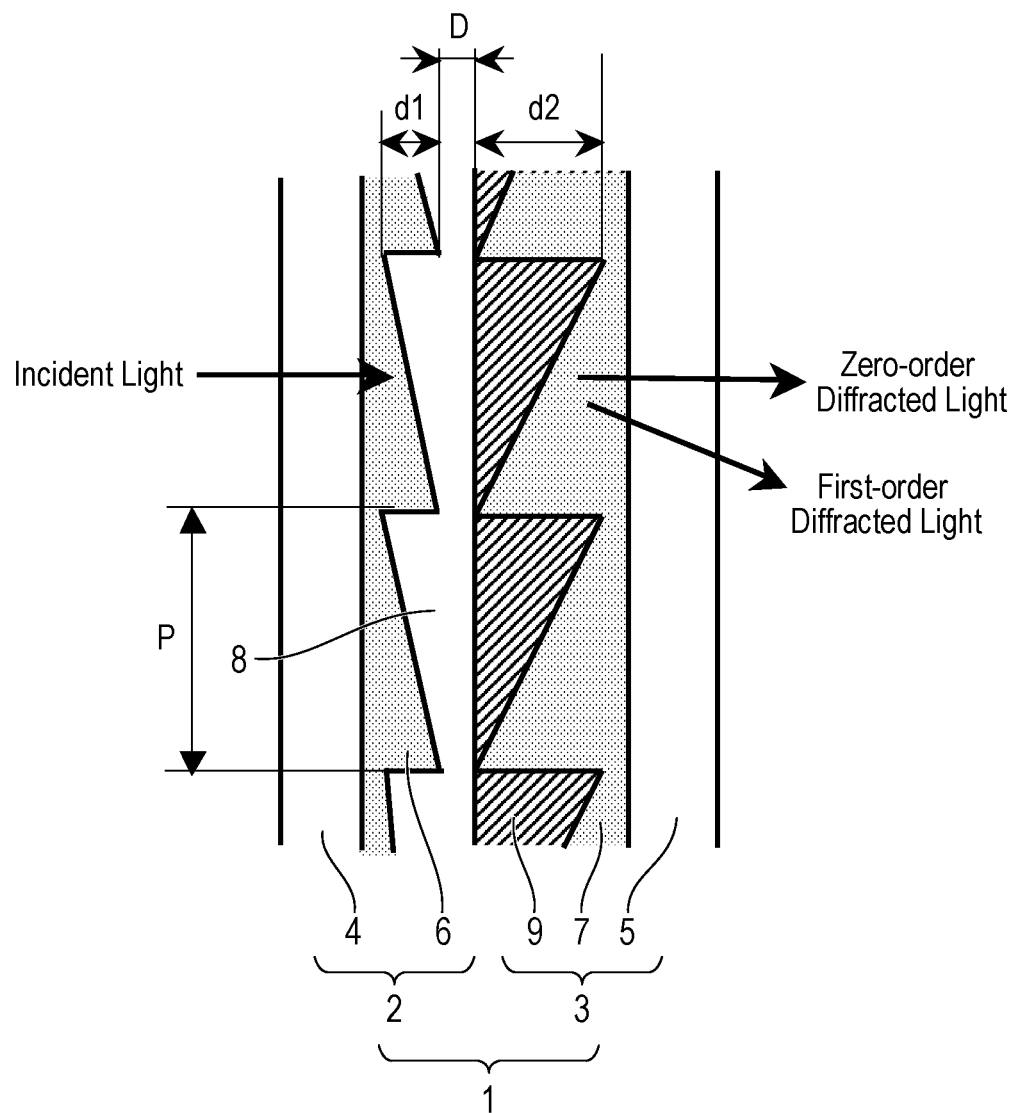
Figure 8A:
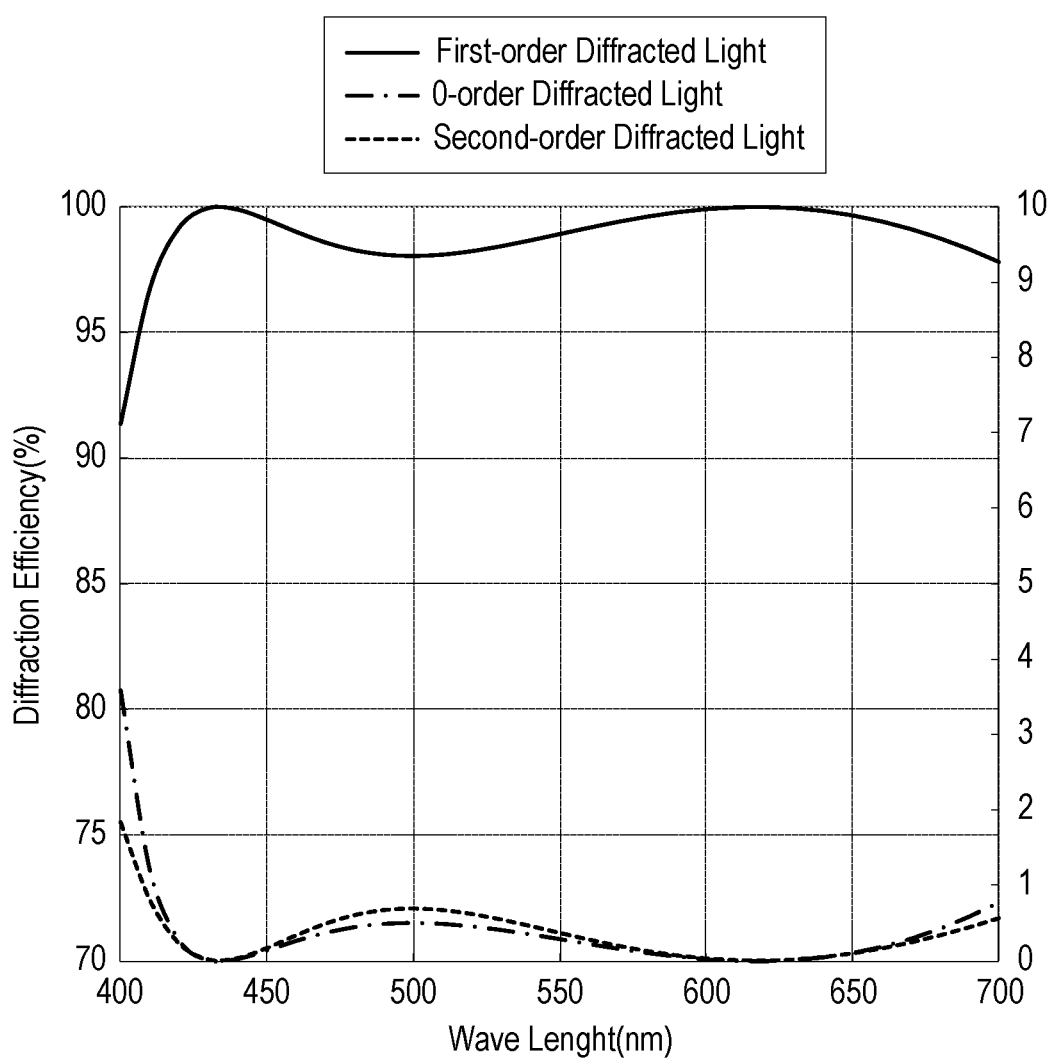

In FIG. 8A, there are shown wavelength dependence characteristics of diffraction efficiency with respect to first-order diffracted light corresponding to the design order and 0-order diffracted light and second-order diffracted light, which correspond to "(design order) ±1", in the diffractive optical element 1 having the two-layered structure as illustrated in FIG. 7A. In the structure of the diffractive optical element 1, with respect to a material of the first diffraction grating 6, nd1=1.636 and vd1=22.8. The grating thickness d1 is equal to 7.88 μm. With respect to a material of the second diffraction grating 7, nd2=1.524 and vd2=51.6. The grating thickness d2 is equal to 10.71 μm. An interval D1 is equal to 1.5 μm.

Further, a grating pitch P illustrated in FIG. 7A is equal to 200 μm. As is apparent from FIG. 8A, diffraction efficiency of the design order light (first-order diffracted light) is a high value equal to or larger than approximately 90% over the entire use wavelength region. Diffraction efficiency of the unnecessary diffraction order light (0-order diffracted light and second-order diffracted light) is suppressed to a value equal to or smaller than approximately 5% over the entire use wavelength region.

In the structure illustrated in FIG. 7B, the first diffraction grating 6 made of an ultraviolet curing resin is formed on the base 4, and the second diffraction grating 7 made of the same ultraviolet curing resin as that of the first diffraction grating 6 is formed on the another base 5 and buried in a different ultraviolet curing resin 9, to thereby serve as the second diffraction optical portion 3. The first diffraction grating 6 and the second diffraction grating 7 are provided close to each another through the air layer 8 at the interval D. The two diffraction gratings 6 and 7 act as a single diffractive optical element.

In this case, the grating thickness of the first diffraction grating 6 is represented by d1, and the grating thickness of the second diffraction grating 7 is represented by d2. With respect to the grating direction, the grating thicknesses of the first diffraction grating 6 and the second diffraction grating 7 monotonously increase in the direction from top to bottom. When incident light enters the diffractive optical element from the left side as illustrated in FIG. 7B, light traveling in the right oblique downward direction is first-order diffracted light and light traveling in the straight direction is 0-order diffracted light.

In FIG. 8B, there are shown wavelength dependence characteristics of diffraction efficiency with respect to the first-order diffracted light corresponding to the design order and the 0-order diffracted light and the second-order diffracted light, which correspond to "(design order) ±1", in the diffractive optical element 1 having the three-layered structure as illustrated in FIG. 7B. In the structure of the diffractive optical element 1, with respect to a material of the first diffraction grating 6, nd1=1.636 and vd1=22.8. The grating thickness d1 is equal to 2.83 μm. With respect to a material of the second diffraction grating 7, nd2-1=1.524, vd2-1=51.6, nd2-2=1.636, and vd2-2=22.8. The grating thickness d2 is equal to 7.88 μm. The interval D is equal to 1.5 μm.

Further, the grating pitch P illustrated in FIG. 7B is equal to 200 μm. As is apparent from FIG. 8B, as in the case of FIG. 8A, diffraction efficiency of the design order light (first-order diffracted light) is a high value equal to or larger than approximately 90% over the entire use wavelength region. Diffraction efficiency of the unnecessary diffraction order light (0-order diffracted light and second-order diffracted light) is suppressed to a value equal to or smaller than approximately 5% over the entire use wavelength region.

Figure 7C:
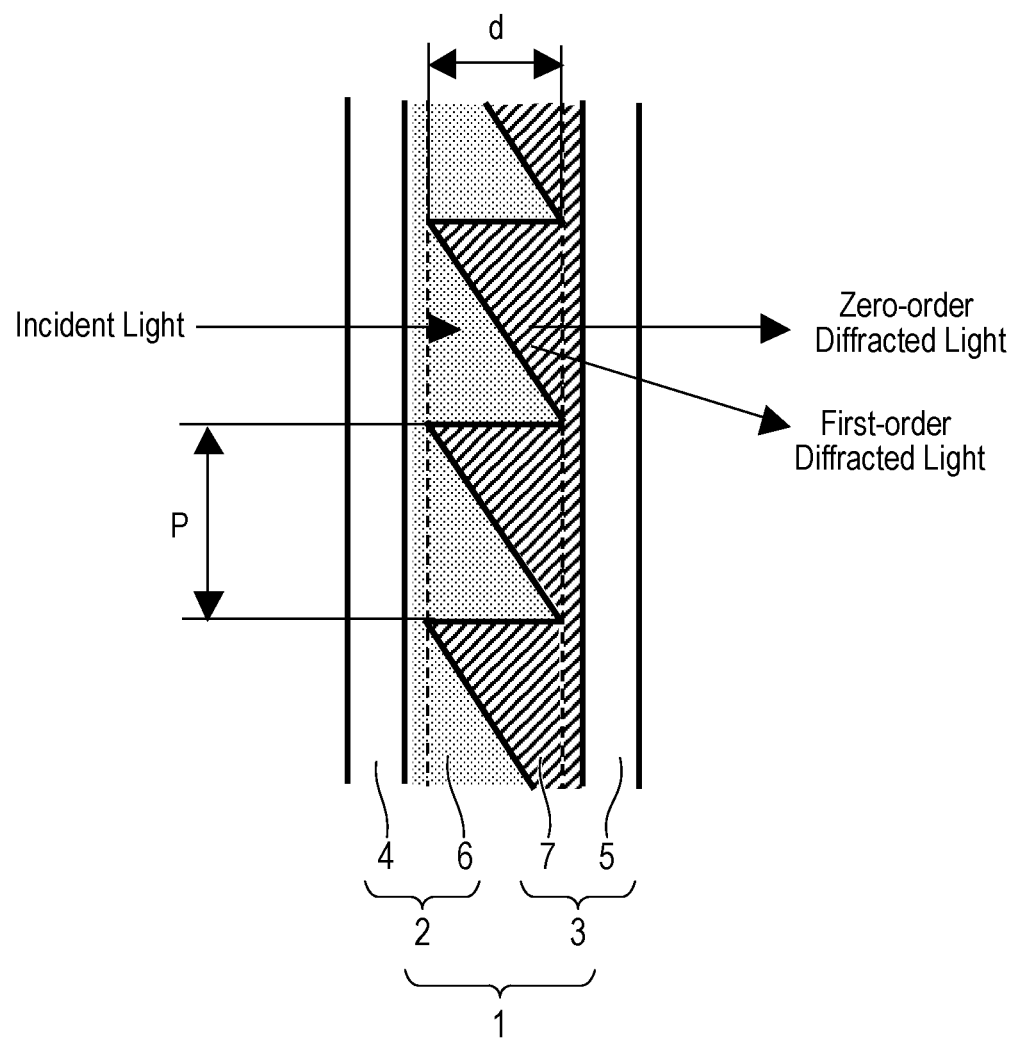

In the structure illustrated in FIG. 7C, the first diffraction grating 6 made of an ultraviolet curing resin is formed on the base 4, the second diffraction grating 7 made of an ultraviolet curing resin different from that of the first diffraction grating 6 is formed on the another base 5, and the first diffraction grating 6 and the second diffraction grating 7 are brought into intimate contact to each other at the same grating thickness "d". The two diffraction gratings 6 and 7 act as the single diffractive optical element 1.

With respect to the grating direction, the grating thickness of the first diffraction grating 6 monotonously increases in the direction from top to bottom. In contrast to this, the grating thickness of the second diffraction grating 7 monotonously decreases in the direction from top to bottom. When incident light enters the diffractive optical element from the left side as illustrated in FIG. 7C, light traveling in the right oblique downward direction is first-order diffracted light and light traveling in the straight direction is 0-order diffracted light.

Figure 8C:
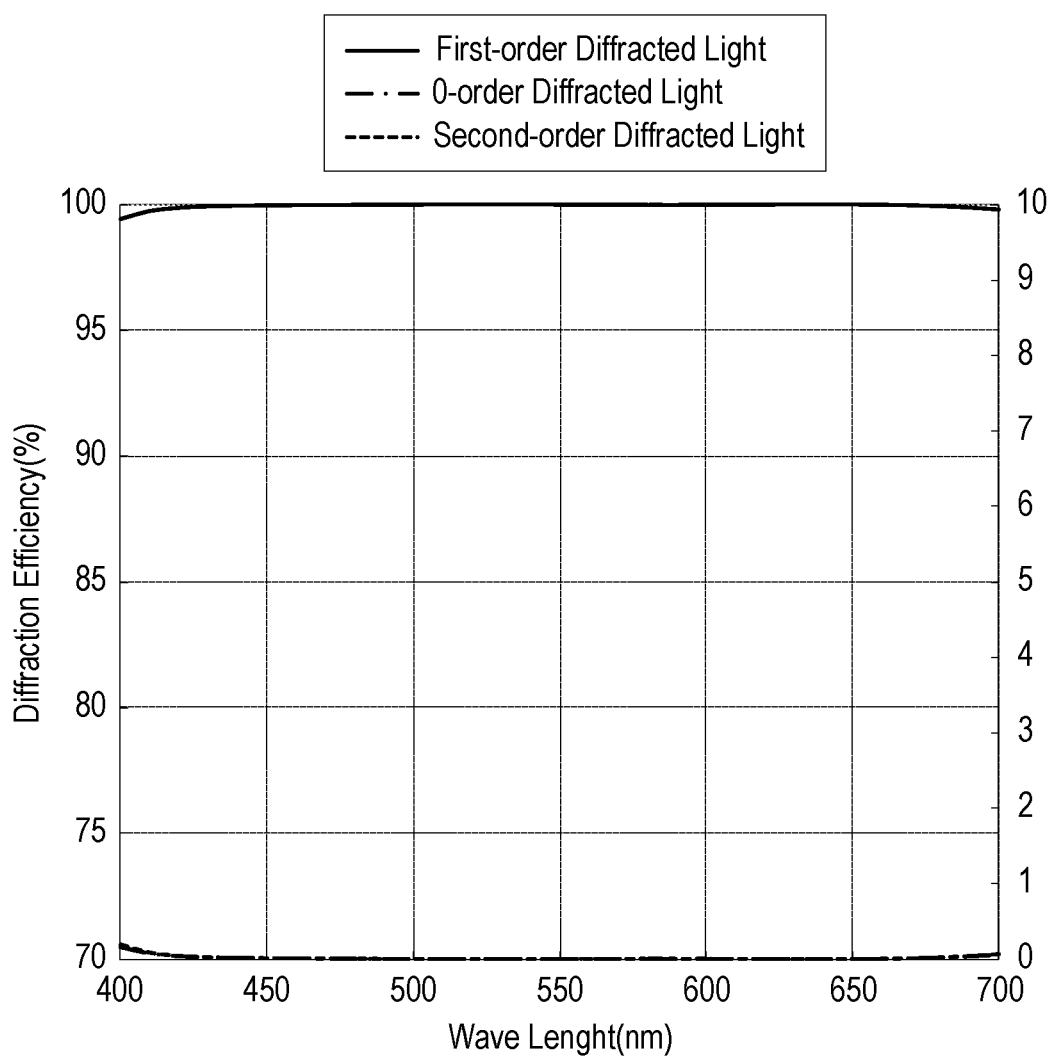

In FIG. 8C, there are shown wavelength dependence characteristics of diffraction efficiency with respect to the first-order diffracted light corresponding to the design order and the 0-order diffracted light and the second-order diffracted light, which correspond to "(design order) ±1", in the diffractive optical element 1 having the cemented two-layer structure as illustrated in FIG. 7C. In the structure of the diffractive optical element 1, with respect to a material of the first diffraction grating 6, nd1=1.620 and vd1=43.0. With respect to a material of the second diffraction grating 7, nd2=1.567 and vd2=19.4. The diffraction gratings 6 and 7 have the same grating thickness "d", which is equal to 11.5 μm. The grating pitch P illustrated in FIG. 7C is equal to 200 μm.

As is apparent from FIG. 8C, diffraction efficiency of the design order light (first-order diffracted light) is a high value equal to or larger than approximately 99.5% over the entire use wavelength region, which is significantly higher than those in the case of FIG. 8A and FIG. 8B. Diffraction efficiency of the unnecessary diffraction order light (0-order diffracted light and second-order diffracted light) is also significantly suppressed to a value equal to or smaller than approximately 0.05% over the entire use wavelength region. As described above, the diffractive optical elements used in the respective Embodiments are described. However, as long as the fundamental performance including the diffraction efficiency is equal to or higher than the performance of the diffractive optical elements described above, the present invention is not limited to the diffractive optical elements used in the respective Embodiments. The diffractive surface of the diffractive optical element is formed on the optical surface, but the curvature radius of the optical surface may correspond to that of a spherical surface, the flat surface, or an aspherical surface.

Figure 9:
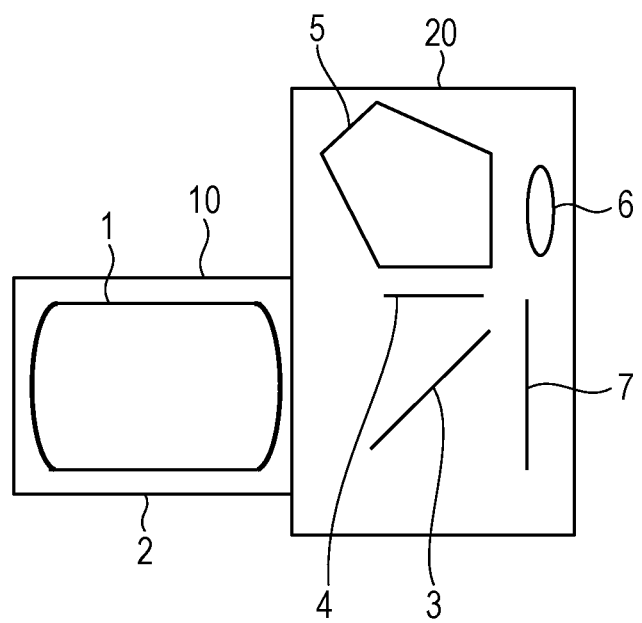
FIG. 9 is a schematic view of a main part of an image pickup apparatus according to one embodiment of the present invention.

Next, an embodiment of the present invention in which the optical system according to one embodiment of the present invention is applied to an image pickup apparatus (camera system) is described with reference to FIG. 9. FIG. 9 is a schematic diagram of a main part of a single-lens reflex camera.

In FIG. 9, an image pickup lens 10 includes an optical system 1 according to any one of Embodiments 1 to 3. The optical system 1 is held by a lens barrel 2, which is a holder member. A camera main body 20 includes a quick return mirror 3 configured to reflect a light flux from the image pickup lens 10 upward, a focusing screen 4 located at an image formation position of an image formed by the image pickup lens 10, and a roof pentaprism 5 configured to convert an inverse image formed on the focusing screen 4 into an erected image. The camera main body 20 further includes an eyepiece lens 6 to be used to observe the erected image and the like.

On a photosensitive surface 7, an image pickup element (photoelectric conversion element) (image pickup portion), such as a CCD sensor or a CMOS sensor, or a silver halide film, which is configured to receive an image, are provided. At the time of photographing, the quick return mirror 3 retracts from an optical path such that an image is formed by the image pickup lens 10 on the photosensitive surface 7. In this manner, by applying the optical system according to each Embodiment to an image pickup apparatus such as a photographing camera, a video camera, or a digital still camera, the image pickup apparatus that is small in weight and has excellent optical characteristics is achieved.

In this embodiment, the optical system according to one embodiment of the present invention can be similarly applied to a mirrorless camera without a quick return mirror.

Now, Numerical Data 1 to 3 corresponding to Embodiments 1 to 3 of the present invention, respectively, are described. In each of Numerical Data, "i" represents the order of a surface counted from the object side, "ri" represents a curvature radius of the i-th surface counted from the object side, "di" represents an interval between the i-th surface and an (i+1)-th surface counted from the object side, "ndi" and "vdi" represent a refractive index and an Abbe number of an i-th optical member, respectively. Further, the effective diameter of each surface is also shown.

In Each Numerical Data, the focal length, the F-number, the half angle of view (degree), the image height, and the total lens length are shown. Further, a back focal length (BF) is an air-equivalent distance from a last lens surface to the image plane. The total lens length is a value obtained by adding the back focal length to a distance from the first lens surface to the last lens surface. In each Numerical Data, two surfaces closest to the image side correspond to the glass block, for example, a filter. Numerical values are those obtained when focus is at infinity. Further, when a displacement amount from a surface vertex in the optical-axis direction is represented by X, a height from the optical axis in a direction vertical to the optical axis is represented by "h", a paraxial curvature radius is represented by R, a conic constant is represented by "k", and the aspherical surface coefficients of the respective orders are represented by A1, A2, A3, A4, . . . , the shape of the aspherical surface is represented by the following expression.

$$X(r) = \frac{(1/R)h^2}{1+\sqrt{1-(1+k)(h/R)^2}} + Bh^4 + Ch^6 + Dh^8 + Eh^{10}$$

When a diffraction order of diffraction light is represented by "m", a design wavelength is represented by $\lambda 0$, a height in the direction vertical to the optical axis is represented by "h", and a phase coefficient is represented by Ci (i=1, 2, 3, . . . ), a phase function "ψ" of the diffraction optical surface in each Embodiment is expressed by the following expression.

$$\psi(h,m) = (2\pi/m\lambda 0) \times (C1 \cdot h^2 + C2 \cdot h^4 + C3 \cdot h^6 + \ldots)$$

Further, each conditional expression in each Embodiment is shown in Table 1.

[Numerical Data 1]

| Unit: mm | | | | | |
|---|---|---|---|---|---|
| Surface data | | | | | |
| Surface number | r | d | nd | vd | Effective diameter |
| 1* | 275.446 | 15.31 | 1.48749 | 70.2 | 141.99 |
| 2 | −875.012 | 166.05 | | | 141.43 |
| 3 | 123.571 | 3.30 | 1.73800 | 32.3 | 84.60 |
| 4 (Diffraction) | 80.715 | 16.88 | 1.49700 | 81.5 | 81.26 |
| 5 | −867.743 | 47.55 | | | 79.28 |
| 6 (Stop) | ∞ | 12.63 | | | 47.24 |
| 7* | 278.995 | 5.67 | 1.80809 | 22.8 | 41.72 |
| 8 | −275.569 | 2.91 | 1.80000 | 29.8 | 40.12 |
| 9 | 52.200 | (Variable) | | | 37.37 |
| 10 | 50.009 | 5.50 | 1.66998 | 39.3 | 37.00 |
| 11 | −89.654 | 1.80 | 1.88300 | 40.8 | 36.99 |
| 12 | −353.289 | (Variable) | | | 36.09 |
| 13 | −210.084 | 1.90 | 1.88300 | 40.8 | 27.54 |
| 14 | 31.981 | 7.60 | 1.48749 | 70.2 | 26.14 |
| 15 | −56.987 | 1.85 | | | 25.78 |
| 16 | 1,485.066 | 3.65 | 1.84666 | 23.8 | 28.46 |
| 17 | −82.206 | 1.70 | 1.88300 | 40.8 | 27.92 |
| 18 | 62.996 | 2.95 | | | 26.99 |
| 19 | −97.817 | 1.70 | 1.88300 | 40.8 | 26.98 |
| 20 | 266.469 | 11.37 | | | 27.33 |
| 21 | 267.915 | 5.50 | 1.80000 | 29.8 | 26.88 |
| 22 | −120.792 | 2.50 | 1.80809 | 22.8 | 27.91 |
| 23 | −359.604 | 7.67 | | | 29.01 |
| 24 | 108.548 | 1.80 | 1.84666 | 23.8 | 34.68 |
| 25 | 35.053 | 2.94 | 1.88300 | 40.8 | 35.51 |
| 26 | 55.807 | 3.99 | | | 35.65 |
| 27 | 78.774 | 10.23 | 1.72047 | 34.7 | 39.32 |
| 28 | −31.926 | 1.80 | 1.59282 | 68.6 | 39.57 |
| 29 | −123.732 | 2.00 | | | 40.94 |
| 30 | ∞ | 2.00 | 1.51633 | 64.1 | 41.37 |
| 31 | ∞ | 106.10 | | | 41.52 |
| Image plane | ∞ | | | | |

| Aspherical surface data |
|---|
| First surface |

K = −3.88159e−001   B = −1.07528e−008   C = −2.00762e−013
D = 1.72042e−017    E = −1.24301e−021

Fourth surface (diffractive surface)

C1 = −4.17590e−005   C2 = −1.12000e−009   C3 = 3.14195e−012
C4 = −1.02098e−014   C5 = 1.32724e−017    C6 = −7.46793e−021
C7 = 6.86543e−025    C8 = 1.11590e−027    C9 = −4.54180e−031
C10 = 4.92533e−035

Seventh surface

K = 0.00000e+000    B = −1.12756e−007   C = −3.72258e−012
D = 2.70885e−013    E = −2.99840e−016

| Various data | |
|---|---|
| Focal length | 584.99 |
| F-number | 4.12 |
| Half angle of view (degrees) | 2.12 |
| Image height | 21.64 |
| Total lens length | 474.74 |
| BF | 109.42 |
| d9 | 16.22 |
| d12 | 2.50 |

-continued

| Unit: mm | |
|---|---|
| Entrance pupil position | 606.26 |
| Exit pupil position | −323.51 |
| Front principal point position | 394.67 |
| Rear principal point position | −478.90 |

Zoom lens unit data

| Unit | First surface | Focal length | Lens unit structure length | Front principal point position | Rear principal point position |
|---|---|---|---|---|---|
| 1 | 1 | 647.56 | 270.29 | −1,188.43 | −489.88 |
| 2 | 10 | 74.14 | 7.30 | 0.21 | −4.06 |
| 3 | 13 | −432.87 | 73.16 | −225.88 | −597.13 |

Single lens data

| Lens | First surface | Focal length |
|---|---|---|
| 1 | 1 | 431.63 |
| 2 | 3 | −335.04 |
| 3 | 4 | 147.64 |
| 4 | 7 | 172.35 |
| 5 | 8 | −54.64 |
| 6 | 10 | 48.68 |
| 7 | 11 | −136.50 |
| 8 | 13 | −31.32 |
| 9 | 14 | 43.23 |
| 10 | 16 | 92.10 |
| 11 | 17 | −40.17 |
| 12 | 19 | −80.86 |
| 13 | 21 | 104.73 |
| 14 | 22 | −226.14 |
| 15 | 24 | −61.84 |
| 16 | 25 | 100.09 |
| 17 | 27 | 32.80 |
| 18 | 28 | −73.12 |
| 19 | 30 | 0.00 |

[Numerical Data 2]

Unit: mm

Surface data

| Surface number | r | d | nd | vd | Effective diameter |
|---|---|---|---|---|---|
| 1* | 251.818 | 15.46 | 1.48749 | 70.2 | 141.99 |
| 2 | −1,214.756 | 165.79 | | | 141.36 |
| 3 | 134.193 | 3.50 | 1.73800 | 32.3 | 84.23 |
| 4 (Diffraction) | 79.843 | 17.10 | 1.49700 | 81.5 | 80.66 |
| 5 | −850.536 | (Variable) | | | 78.74 |
| 6 (Stop) | ∞ | 2.06 | | | 51.14 |
| 7* | 284.577 | 5.67 | 1.80809 | 22.8 | 49.23 |
| 8 | −258.649 | 3.20 | 1.80000 | 29.8 | 47.79 |
| 9 | 85.894 | (Variable) | | | 44.79 |
| 10 | −275.395 | 5.50 | 1.84666 | 23.8 | 36.90 |
| 11 | −41.542 | 1.80 | 1.78472 | 25.7 | 36.70 |
| 12 | −4,147.744 | 2.50 | | | 35.83 |
| 13 | 51.889 | 1.90 | 1.88300 | 40.8 | 34.38 |
| 14 | 28.757 | 8.00 | 1.48749 | 70.2 | 32.51 |
| 15 | 349.850 | 1.99 | | | 31.68 |
| 16 | 307.455 | 3.96 | 1.84666 | 23.8 | 35.98 |
| 17 | −88.940 | 1.70 | 1.88300 | 40.8 | 35.60 |
| 18 | 79.601 | 2.96 | | | 34.44 |
| 19 | −169.916 | 1.70 | 1.88300 | 40.8 | 34.43 |
| 20 | 318.982 | 11.94 | | | 34.69 |
| 21 | 127.345 | 9.22 | 1.80000 | 29.8 | 32.94 |
| 22 | −30.425 | 2.50 | 1.80809 | 22.8 | 33.02 |
| 23 | −153.208 | 7.67 | | | 33.23 |
| 24 | 89.714 | 3.00 | 1.84666 | 23.8 | 32.03 |
| 25 | 48.968 | 1.80 | 1.88300 | 40.8 | 31.08 |
| 26 | 58.725 | 2.69 | | | 30.77 |

-continued

| Unit: mm | | | | | |
|---|---|---|---|---|---|
| 27 | 108.734 | 6.42 | 1.72047 | 34.7 | 30.81 |
| 28 | −35.741 | 1.80 | 1.59282 | 68.6 | 30.62 |
| 29 | 133.757 | 2.00 | | | 29.62 |
| 30 | ∞ | 2.00 | 1.51633 | 64.1 | 29.88 |
| 31 | ∞ | 106.94 | | | 30.18 |
| Image plane | ∞ | | | | |

Aspherical surface data

First surface

K = −2.73875e−001  B = −9.51401e−009  C = −1.70473e−013
D = 9.57473e−018  E = −7.21829e−022

Fourth surface (diffractive surface)

C1 = −3.88293e−005  C2 = −2.68409e−009  C3 = 4.58172e−012
C4 = −1.14551e−014  C5 = 1.34761e−017  C6 = −7.41778e−021
C7 = 7.06246e−025  C8 = 1.11627e−027  C9 = −4.77827e−031
C10 = 5.80330e−035

Seventh surface

K = 0.00000e+000  B = −2.55588e−008  C = 1.36162e−011
D = −3.18865e−014  E = 1.65185e−017

Various data

| Focal length | 584.99 |
|---|---|
| F-number | 4.12 |
| Half angle of view (degrees) | 2.12 |
| Image height | 21.64 |
| Total lens length | 474.74 |
| BF | 110.26 |
| d5 | 44.01 |
| d9 | 28.80 |
| Entrance pupil position | 569.18 |
| Exit pupil position | −128.00 |
| Front principal point position | −302.42 |
| Rear principal point position | −478.05 |

Zoom lens unit data

| Unit | First surface | Focal length | Lens unit structure length | Front principal point position | Rear principal point position |
|---|---|---|---|---|---|
| 1 | 1 | 238.33 | 201.85 | 133.29 | −110.08 |
| 2 | 6 | −158.41 | 10.92 | 9.29 | 2.22 |
| 3 | 10 | −2,601.43 | 83.05 | −473.92 | −655.50 |

Single lens data

| Lens | First surface | Focal length |
|---|---|---|
| 1 | 1 | 429.35 |
| 2 | 3 | −280.55 |
| 3 | 4 | 146.10 |
| 4 | 7 | 168.46 |
| 5 | 8 | −80.27 |
| 6 | 10 | 57.17 |
| 7 | 11 | −53.48 |
| 8 | 13 | −75.98 |
| 9 | 14 | 63.75 |
| 10 | 16 | 81.85 |
| 11 | 17 | −47.35 |
| 12 | 19 | −125.35 |
| 13 | 21 | 31.52 |
| 14 | 22 | −47.41 |
| 15 | 24 | −131.79 |
| 16 | 25 | 307.20 |
| 17 | 27 | 38.04 |
| 18 | 28 | −47.39 |
| 19 | 30 | 0.00 |

[Numerical Data 3]

Unit: mm

Surface data

| Surface number | r | d | nd | vd | Effective diameter |
|---|---|---|---|---|---|
| 1* | 468.574 | 10.50 | 1.48749 | 70.2 | 118.32 |
| 2 | −374.578 | 145.44 | | | 118.16 |
| 3 | 90.480 | 2.90 | 1.73800 | 32.3 | 76.79 |
| 4 (Diffraction) | 63.974 | 16.88 | 1.49700 | 81.5 | 73.58 |
| 5 | −764.853 | 38.00 | | | 71.75 |
| 6 (Stop) | ∞ | 4.01 | | | 44.69 |
| 7* | 132.145 | 5.66 | 1.80809 | 22.8 | 42.93 |
| 8 | −188.034 | 2.57 | 1.80000 | 29.8 | 41.57 |
| 9 | 45.811 | (Variable) | | | 37.75 |
| 10 | 46.812 | 3.52 | 1.59522 | 67.7 | 37.00 |
| 11 | 102.725 | 3.26 | 1.60342 | 38.0 | 36.43 |
| 12 | 925.609 | (Variable) | | | 35.66 |
| 13 | 178.711 | 1.68 | 1.88300 | 40.8 | 28.22 |
| 14 | 25.492 | 6.98 | 1.48749 | 70.2 | 26.15 |
| 15 | −185.195 | 1.85 | | | 25.41 |
| 16 | 1,819.772 | 3.57 | 1.84666 | 23.8 | 27.35 |
| 17 | −46.650 | 1.50 | 1.88300 | 40.8 | 26.97 |
| 18 | 49.895 | 3.13 | | | 25.78 |
| 19 | −68.063 | 1.50 | 1.88300 | 40.8 | 25.78 |
| 20 | −712.336 | 11.26 | | | 26.30 |
| 21 | 85.083 | 8.54 | 1.80000 | 29.8 | 27.62 |
| 22 | −26.126 | 2.20 | 1.80809 | 22.8 | 27.75 |
| 23 | −123.234 | 6.50 | | | 28.00 |
| 24 | 478.204 | 3.00 | 1.84666 | 23.8 | 28.58 |
| 25 | 77.117 | 1.60 | 1.88300 | 40.8 | 29.14 |
| 26 | 62.015 | 1.86 | | | 29.38 |
| 27 | 97.345 | 5.76 | 1.72047 | 34.7 | 30.32 |
| 28 | −31.383 | 1.60 | 1.59282 | 68.6 | 30.48 |
| 29 | −186.469 | 1.75 | | | 31.45 |
| 30 | ∞ | 2.00 | 1.51633 | 64.1 | 31.97 |
| 31 | ∞ | 95.10 | | | 32.25 |
| Image plane | ∞ | | | | |

Aspherical surface data

First surface

K = −3.27295e+000   B = −2.46315e−008   C = −2.16548e−013
D = 3.46219e−017    E = −2.90970e−021

Fourth surface (diffractive surface)

C1 = −3.54392e−005   C2 = −3.69769e−009   C3 = 9.64480e−012
C4 = −2.83497e−014   C5 = 4.21943e−017    C6 = −2.91275e−020
C7 = 3.47823e−024    C8 = 7.16574e−027    C9 = −3.96358e−030
C10 = 6.27928e−034

Seventh surface

K = 0.00000e+000   B = −1.49519e−007   C = 5.48018e−012
D = 3.35077e−014   E = −1.54990e−017

Various data

| Focal length | 487.49 |
|---|---|
| F-number | 4.12 |
| Half angle of view (degrees) | 2.54 |
| Image height | 21.64 |
| Total lens length | 409.74 |
| BF | 98.42 |
| d9 | 14.44 |
| d12 | 2.00 |
| Entrance pupil position | 444.59 |
| Exit pupil position | −139.76 |
| Front principal point position | −79.78 |
| Rear principal point position | −392.39 |

Zoom lens unit data

| Unit | First surface | Focal length | Lens unit structure length | Front principal point position | Rear principal point position |
|---|---|---|---|---|---|
| 1 | 1 | 414.05 | 225.96 | −413.57 | −286.83 |
| 2 | 10 | 82.13 | 6.78 | −0.21 | −4.44 |
| 3 | 13 | −137.41 | 66.27 | −47.17 | −151.86 |

Single lens data

| Lens | First surface | Focal length |
|---|---|---|
| 1 | 1 | 428.77 |
| 2 | 3 | −317.21 |
| 3 | 4 | 118.60 |
| 4 | 7 | 96.80 |
| 5 | 8 | −45.82 |
| 6 | 10 | 141.17 |
| 7 | 11 | 191.20 |
| 8 | 13 | −33.85 |
| 9 | 14 | 46.47 |
| 10 | 16 | 53.77 |
| 11 | 17 | −27.11 |
| 12 | 19 | −85.32 |
| 13 | 21 | 25.87 |
| 14 | 22 | −41.45 |
| 15 | 24 | −108.97 |
| 16 | 25 | −377.37 |
| 17 | 27 | 33.57 |
| 18 | 28 | −63.90 |
| 19 | 30 | 0.00 |

TABLE 1

| Conditional expression number | Lower limit value | Upper limit value | Embodiment 1 | Embodiment 2 | Embodiment 3 |
|---|---|---|---|---|---|
| (1) | 0.500 | 1.000 | 0.820 | 0.830 | 0.808 |
| (2) | 0.010 | 0.100 | 0.080 | 0.074 | 0.056 |
| (3) | 0.050 | 0.500 | 0.127 | 0.271 | 0.168 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-122038, filed Jun. 22, 2017, which is hereby incorporated by reference herein in its entirety.

What is claimed is:

1. An optical system consisting of, in order from an object side to an image side:
a front lens unit;
an aperture stop of which an aperture diameter is variable; and
a rear lens unit,
wherein the front lens unit consists of a positive lens and a diffractive optical element, which are arranged in order from the object side to the image side,
wherein the diffractive optical element consists of a plurality of lenses that are cemented to each other, and at least one of cemented surfaces of the plurality of lenses is a diffractive surface, and wherein an interval on an optical axis between the positive lens and the diffractive optical element is largest among intervals on the optical axis between two lenses that are adjacent in the optical system.

2. The optical system according to claim 1, wherein the following conditional expression is satisfied:

$$0.5<(L1a/Lsto)/(Ltot/f)<1.0,$$

where L1a is an interval between the positive lens and the diffractive optical element on the optical axis, Lsto is a distance from an object-side lens surface of the positive lens to the aperture stop on the optical axis, Ltot is a total length of the optical system under a state in which focus is at infinity, and "f" is a focal length of the optical system under the state in which the focus is at infinity.

3. The optical system according to claim 1, wherein the following conditional expression is satisfied:

$$0.01<(f/fdo)/(Ldoimg/Ltot)<0.10,$$

where Ltot is a total length of the optical system under a state in which focus is at infinity, f is a focal length of the optical system under the state in which the focus is at infinity, fdo is a focal length of the diffractive surface, and Ldoimg is a distance on the optical axis from the diffractive surface to an image plane.

4. The optical system according to claim 1, wherein the rear lens unit includes a focus lens unit configured to move in an optical axis direction for focusing.

5. The optical system according to claim 4, wherein the following conditional expression is satisfied:

$$0.05<|ffo/f|<0.50,$$

where f is a focal length of the optical system under a state in which focus is at infinity, and ffo is a focal length of the focus lens unit.

6. The optical system according to claim 4, wherein the rear lens unit consists of, in order from the object side to the image side:
 a lens sub-unit configured not to move for focusing;
 a focus lens unit configured to move in the optical axis direction for focusing; and
 a lens sub-unit configured not to move for focusing.

7. The optical system according to claim 4, wherein the rear lens unit consists of, in order from the object side to the image side:
 a focus lens unit configured to move in the optical axis direction for focusing; and
 a lens sub-unit configured not to move for focusing.

8. The optical system according to claim 1, wherein the front lens unit includes a lens having an aspherical surface.

9. The optical system according to claim 1, wherein the rear lens unit includes a partial lens unit configured to move in a direction having a component in a direction orthogonal to the optical axis at a time of image stabilization.

10. An image pickup apparatus comprising:
 an optical system; and
 an image pickup element configured to receive an image formed by the optical system,
 the optical system consisting of, in order from an object side to an image side:
 a front lens unit;
 an aperture stop of which an aperture diameter is variable; and
 a rear lens unit,
 wherein the front lens unit consists of a positive lens and a diffractive optical element, which are arranged in order from the object side to the image side,
 wherein the diffractive optical element consists of a plurality of lenses that are cemented to each other, and at least one of cemented surfaces of the plurality of lenses is a diffractive surface, and
 wherein an interval on an optical axis between the positive lens and the diffractive optical element is largest among intervals on the optical axis between two lenses that are adjacent in the optical system.

11. The image pickup apparatus according to claim 10, wherein the optical system has a maximum half angle of view of 4.5 degrees or smaller.

* * * * *